(12) United States Patent
Wang et al.

(10) Patent No.: US 10,050,874 B2
(45) Date of Patent: Aug. 14, 2018

(54) MEDIA ACCESS CONTROL ADDRESS LEARNING FOR PACKETS

(71) Applicant: Nicira, Inc., Palo Alto, CA (US)

(72) Inventors: Ziyou Wang, Beijing (CN); Hua Wang, Beijing (CN); Anupam Chanda, Los Altos, CA (US); Jianjun Shen, Beijing (CN); Donghai Han, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 109 days.

(21) Appl. No.: 15/340,620

(22) Filed: Nov. 1, 2016

(65) Prior Publication Data
US 2018/0123951 A1     May 3, 2018

(51) Int. Cl.
| | | |
|---|---|---|
| *H04L 12/723* | (2013.01) | |
| *H04L 12/18* | (2006.01) | |
| *H04L 12/46* | (2006.01) | |
| *H04L 12/715* | (2013.01) | |
| *H04L 12/741* | (2013.01) | |

(52) U.S. Cl.
CPC ............ *H04L 45/507* (2013.01); *H04L 12/18* (2013.01); *H04L 12/4633* (2013.01); *H04L 45/64* (2013.01); *H04L 45/74* (2013.01)

(58) Field of Classification Search
CPC ... H04L 45/507; H04L 12/18; H04L 12/4633; H04L 45/64; H04L 45/74; H04L 61/6022; H04L 61/10; H04L 61/25–61/6063
USPC ........................................................ 370/390
See application file for complete search history.

(56) References Cited

U.S. PATENT DOCUMENTS

| | | | | |
|---|---|---|---|---|
| 6,456,597 | B1* | 9/2002 | Bare ................. | H04L 29/12009 370/252 |
| 7,751,399 | B2* | 7/2010 | Martini .................... | H04L 45/50 370/392 |
| 7,813,345 | B2* | 10/2010 | Serbest ................... | H04L 45/10 370/390 |
| 9,374,294 | B1* | 6/2016 | Pani ....................... | H04L 12/18 |
| 9,432,213 | B2* | 8/2016 | Unbehagen ........... | H04L 12/462 |
| 2004/0213228 | A1* | 10/2004 | Tingle ................... | H04L 12/462 370/389 |
| 2015/0063353 | A1* | 3/2015 | Kapadia ................ | H04L 45/745 370/392 |
| 2016/0043950 | A1* | 2/2016 | Vobbilisetty .......... | H04L 45/745 370/392 |
| 2016/0323319 | A1* | 11/2016 | Gourlay ................. | H04L 49/70 |

(Continued)

OTHER PUBLICATIONS eos.arista.com; VXLAN Without Controller for Network Virtualization with Arista physical VTEPs; http://eos.arista.com/vxlan-without-controller-for-network-virtualization-with-arista-physical-vteps/#4_BUM_traffic_with_VXLAN; 14 pages.

*Primary Examiner* — Maharishi V Khirodhar
*Assistant Examiner* — Kenneth P Hunt
(74) *Attorney, Agent, or Firm* — Patterson & Sheridan LLP

(57) ABSTRACT

Certain embodiments described herein are generally directed to media access control (MAC) address learning for packets sent between end points (EPs) in a network (e.g., overlay network). For example, in some embodiments, VTEPs may be used to provide packet forwarding services, load balancing services, gateway services, etc., to EPs in the network. In certain embodiments, the VTEPs may be assigned unique labels, which are used by the VTEPs to map MAC addresses of packets to destination addresses for the packets.

22 Claims, 5 Drawing Sheets

(56) References Cited

U.S. PATENT DOCUMENTS

2016/0330143 A1* 11/2016 Song ..................... H04L 61/103
2017/0228251 A1* 8/2017 Yang ................... G06F 9/45558

* cited by examiner

MEDIA ACCESS CONTROL ADDRESS LEARNING FOR PACKETS

BACKGROUND

In some aspects, physical machines may be connected into an overlay network (e.g., logical network). For example, a data center operator may run certain services (e.g., file server, database server, etc.) on a specific physical machine (e.g., physical servers) instead of in a virtual machine (VM) that is part of the overlay network, but still want to connect the physical machine into the overlay network to gain the benefits of a software defined networking (SDN) solution. In order to couple the physical machines to the overlay network, specialized hardware switches may be implemented in the network to bridge packets between the physical machine's network and the overlay network. These hardware switches, in some embodiments, may be referred to as hardware VTEPs, which stands for "VXLAN tunnel endpoints." It should be noted, though, that the term "VTEP" is now used regardless of the tunneling protocol and sometimes as a backronym of "virtual tunnel endpoint," which can be confusing because the tunnel is not actually "virtual."

SUMMARY

Herein described are one or more embodiments of a method for performing media access control learning. The method includes receiving, at a destination VTEP, an encapsulated packet. The encapsulated packet includes a source address associated with an intermediate VTEP, a destination address associated with the destination VTEP, and a first label associated with a source VTEP. The encapsulated packet further includes an inner packet. The inner packet includes a source media access control address of a source endpoint. The method further includes receiving, at the destination VTEP, information indicative of a plurality of labels and associated addresses of VTEPs. The method further includes determining, by the destination VTEP, a first address associated with the source VTEP based on the first label and the information indicative of the plurality of labels and associated addresses of VTEPs. The method further includes mapping the first address of the source VTEP to the source media access control address of the source endpoint.

Also described herein are embodiments of a non-transitory computer readable medium comprising instructions to be executed in a computer system, wherein the instructions when executed in the computer system perform a method described above for performing media access control learning.

Also described herein are embodiments of a computer system, wherein software for the computer system is programmed to execute the method described above for performing media access control learning.

DETAILED DESCRIPTION

Embodiments presented herein relate to media access control (MAC) address learning for packets sent between end points in a network (e.g., overlay network). For example, in some embodiments, VTEP services may be implemented at an edge or at a gateway. Edge VTEPs are generally connected to virtual switches implemented by the hypervisor for VMs on the same physical host. Hardware VTEPs are often integrated into top-of-rack (TOR) switches, but could be provided as a stand-alone appliance for bridging logical overlay networks with physical networks. In certain embodiments, the edge VTEPs may be assigned unique labels, which may be used by the VTEPs to map MAC addresses of packets to destination IP addresses for the packets as further described below.

Figure 1:
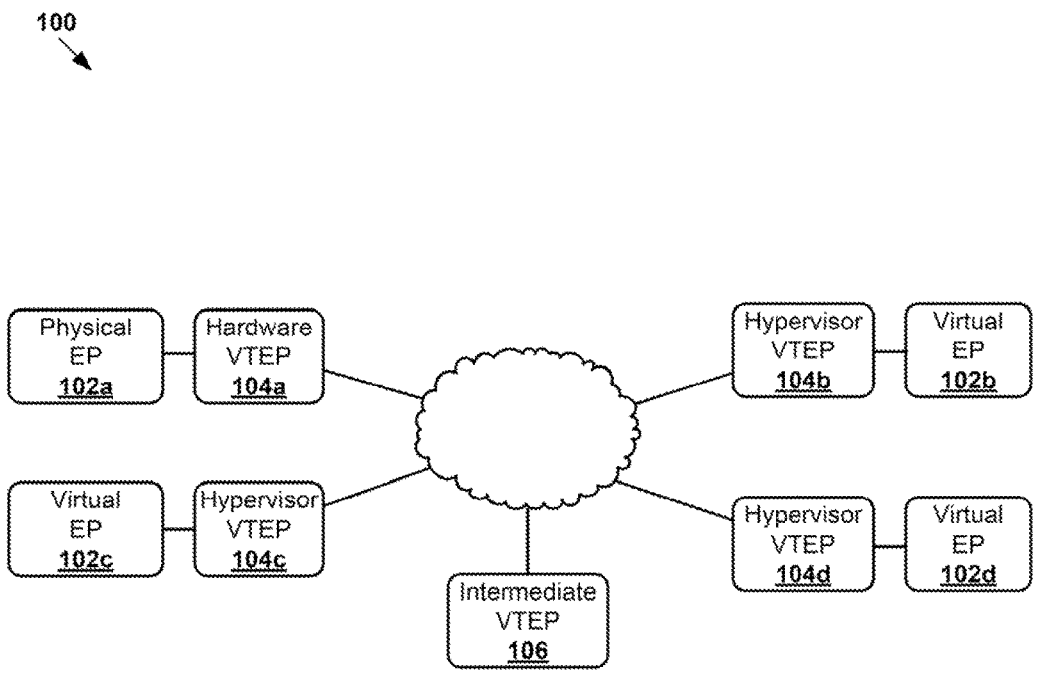
FIG. 1 is a block diagram of a network in which one or more embodiments of the present invention may be implemented.

FIG. 1 is a block diagram of a network 100 in which one or more embodiments of the present invention may be implemented. It should be understood that network 100 may include additional and/or alternative components than that shown, depending on the desired implementation. Network 100 includes one or more end points (EPs) 102. An EP (e.g., EP 102) may refer generally to an originating node ("source endpoint") or terminating node ("destination endpoint") of a flow of network packets, which can comprise one or more network packets being passed from the source to the destination endpoint. In practice, an endpoint may be a physical computing device (e.g., physical server, physical host), virtualized computing instance (e.g., virtual machine, container, data compute node, isolated user space instance) supported by a physical computing device, etc. For example, EP 102a is a physical computing device. Further, each of EPs 102b-102d is a virtualized computing instance, i.e., a virtual machine, container (such as a Docker container), or other logical compute node.

Network 100 further includes one or more VTEPs 104 that provide one or more of packet forwarding services, load balancing services, gateway services, etc., to EPs 102. VTEPs 104 may be implemented by or executed on physical devices. For example, VTEP 104a may be a hardware VTEP (e.g., integrated with a hardware switch such as a top-of-rack (ToR) switch). Further, VTEPs 104b-104d may be implemented by a hypervisor (e.g., a virtual switch of the hypervisor) running on a host, which is a physical computing device that supports execution of virtual machines or other virtualized computing instances. One or more VTEPs 104b-104d and EPs 102b-102d may reside on the same physical computing device, or on different computing devices.

As discussed, VTEPs 104 may provide connectivity between associated EPs 102. For example, as shown, VTEPs 104a-104d are associated with EPs 102a-102d, respectively. VTEPs 104 may provide connectivity between each other, to provide connectivity between associated EPs 102. To provide connectivity between VTEPs 104, a "tunnel" (not shown for simplicity) may be established between the pair of VTEPs using a suitable protocol (e.g., Stateless Transport Tunneling (STT), Virtual eXtension Local Area Network (VXLAN), Network Virtualization Generic Routing Protocol (NVGRE), Geneve, etc.). The term "tunnel" may generally refer to encapsulated communication between a pair of VTEPs. For example, before forwarding data packets from EP 102b, VTEP 104b performs encapsulation to generate encapsulated packets. The original data packet in the encapsulated packet may be referred to as the inner packet. Encapsulating the packet may include adding certain header information to the packet, such as addresses of the source VTEP and destination VTEP for the encapsulated packet. The originating VTEP (e.g., associated with the source EP) that sends a packet may be referred to as a source VTEP. The terminating VTEP (e.g., associated with the destination endpoint) that receives the packet may be referred to as the destination VTEP.

The term "layer-2" generally refers to a data link layer (e.g., Media Access Control (MAC) or Ethernet layer), "layer-3" to a network layer (e.g., Internet Protocol (IP) layer), and "layer-4" to a transport layer (e.g., Transmission Control Protocol (TCP) layer) in the Open System Interconnection (OSI) model, although the concepts described herein and referred to simply as "MAC" and "IP" may be applicable to corresponding layers in other networking models. The term "packet" may refer generally to a group of bits that can be transported together, and may be in another form, such as "frame", "message", "segment", etc. In some embodiments, the packet may include a payload (e.g., data) and header information, such as a source MAC address corresponding to the MAC address of the EP that generated the packet, a source port corresponding to the port of the EP that generated the packet, a destination MAC address corresponding to the MAC address of the destination EP, a destination port corresponding to the port of the destination EP, and/or a protocol used for the packet.

Hardware VTEP 104a may forward data packets from EP 102a to another VTEP 104. For example, hardware VTEP 104a may send a layer-2 packet received from physical endpoint 102a through a tunnel (e.g., VXLAN tunnel) to VTEP 104b based on the destination MAC address in the packet corresponding to EP 102b, which is associated with VTEP 104b.

In particular, EP 102a may generate a packet (e.g., unicast packet) to send to EP 102b (e.g., an application running on EP 102b). The packet may include a source MAC address corresponding to the MAC address of EP 102a, and a destination MAC address corresponding to the MAC address of EP 102b. For example, the packet may include a destination MAC address corresponding to the MAC address of EP 102b when both EP 102a and EP 102b are connected to the same logical switch. However, in some embodiments, there may be a logical router interposed between the endpoints, and the destination MAC address may then correspond with the logical router rather than EP 102b. The destination layer 3 (IP) address of the packet may still correspond to the destination EP 102b. EP 102a, which is a physical system, may send the packet to the top-of-rack switch which may act as or include VTEP 104a. VTEP 104a therefore acts as a source VTEP for the packet sent from EP 102a. VTEP 104a then determines if it has (e.g., stored in local memory accessible by the VTEP) a mapping of the destination MAC address indicated in the packet to a destination layer-3 address (i.e., an IP address) of a destination VTEP 104. If VTEP 104a has the mapping of the destination MAC address of EP 102b to the destination IP address of VTEP 104b, VTEP 104a encapsulates the packet with an outer packet header (e.g., according to VXLAN tunneling protocol) and sets a destination IP address of the outer header in the encapsulated packet to the IP address of the VTEP 104b, and the source IP address in the outer header of the packet as that of VTEP 104a. VTEP 104a then sends the encapsulated packet to VTEP 104b.

If VTEP 104a cannot map the destination MAC address of the packet received from endpoint 102a to a destination VTEP or the packet is not a unicast packet (i.e., if the packet is a broadcast, unknown unicast, or multicast (BUM) packet), VTEP 104a encapsulates the packet and sets a destination IP address of the encapsulated packet as that of intermediate VTEP 106, and the source address in the encapsulated packet as that of VTEP 104a. In particular, VTEP 104a may not have the capability to determine the mapping of a destination MAC address to a destination VTEP that it does not already have the mapping for, and further may not have the capability to directly forward broadcast and multicast packets to the appropriate destination.

Intermediate VTEP 106 is a specialized VTEP, which may be implemented as a virtual appliance, i.e., as a service implemented on a virtual machine. In one embodiment, intermediate VTEP 106 may be configured to receive encapsulated BUM packets from a source VTEP such as hardware VTEP 104a and process BUM packets to identify the appropriate destination VTEP. For example, the VTEP 106 may be configured to extract the inner packet (original packet) from the encapsulated packet and determine the destination MAC address for the inner packet. The VTEP 106 then determines if it has a mapping of the destination MAC address indicated in the inner packet to destination IP address of the destination VTEP associated with destination MAC address. For any destination MAC address that intermediate VTEP 106 does have a mapping, VTEP 106 encapsulates the packet (e.g., VxSTT packet, Geneve packet, VXLAN packet, etc.) and sets a destination IP address in the outer header of the encapsulated packet as that of the destination VTEP, and the source IP address in the outer header of the encapsulated packet as the IP address of intermediate VTEP 106. Intermediate VTEP 106 then sends the encapsulated packet to the destination VTEP.

For any destination MAC address that intermediate VTEP 106 does not have a mapping, the VTEP 106 may query such information from one or more other devices such as a central control plane of the network 100, which may also be referred to as an SDN controller cluster as described in more detail below with reference to FIG. 2. Alternatively, intermediate VTEP 106 may perform a flooding procedure, whereby the VTEP 106 replicates the packet and sends it to a set of destinations (e.g., all VTEPs that participate in the logical layer-2 network of endpoint 102a, as indicated in a flood list, etc.). In this case, intermediate VTEP 106 encapsulates each of the replicated inner packets so that the outer packet header includes a source IP address of intermediate VTEP 106. Further, each encapsulated packet includes a destination IP address of the VTEP the encapsulated replicated packet is sent to. The receiving VTEPs may determine if the destination MAC address of the inner packet is associated with that VTEP. In other words, if the VTEP receiving a replicated packet from intermediate VTEP 106 is associated with an endpoint that matches the destination MAC address of the inner packet, then it forwards the inner packet to the destination endpoint. Otherwise, the VTEP simply drops the received replicated packet.

In some embodiments, VTEPs 104 and 106 may be configured to learn mappings between inner packet source MAC addresses of a received encapsulated packet and the IP address of the associated source VTEP in the outer header of the received encapsulated packet and store the mappings (e.g., in local memory accessible by the VTEP) based on received packets by a process referred to as "MAC learning." The VTEP may utilize this information for forwarding future packets in the network 100. By performing such MAC learning, the VTEPs can save on processing time and network bandwidth needed for querying necessary information or performing the flooding procedure.

However, if a destination VTEP receives a packet from an intermediate VTEP it may not be able to perform the typical MAC learning procedure. In particular, when the intermediate VTEP re-encapsulates the inner packet, it uses its own IP address as the source IP address in the outer header instead of the IP address of the source VTEP. However, the inner header of the encapsulated packet still includes the source MAC address corresponding to the source endpoint. Accordingly, a destination VTEP trying to perform MAC learning on such a packet would associate the wrong IP address—the IP address of the intermediate VTEP 106 with the MAC address of the source EP instead of the source VTEP which is associated with the source EP. In some embodiments, to prevent a destination VTEP from learning such an incorrect mapping, the intermediate VTEP includes a flag in the outer packet header sent to a destination VTEP 104a that instructs the destination VTEP not to perform MAC learning for that packet.

Accordingly, embodiments herein provide techniques for performing MAC learning even for packets sent via an intermediate VTEP. For example, such techniques may be used for performing MAC learning for networks including VTEPs (e.g., hardware VTEPs) that do not support advanced and extensible protocols. Accordingly, such VTEPs in the network can learn associations between source MAC addresses of an inner packet and the IP address of its associated VTEP, which can save on processing time and network bandwidth needed for querying necessary information or performing a flooding procedure, as previously described.

In some embodiments, each VTEP is assigned a unique identifier, which may be referred to as a VTEP label. In one embodiment, the VTEP label may be a 24-bit unsigned number. Each VTEP, whether it is a hardware VTEP or a hypervisor-based VTEP, is assigned a VTEP label. The VTEPs may then receive information mapping VTEP labels to corresponding IP addresses of the VTEPs.

An intermediate VTEP may be configured to include the VTEP label of the source VTEP in an encapsulated packet sent to a destination VTEP. The destination VTEP can utilize the VTEP label of the source VTEP to identify the IP address of the source VTEP and map that IP address to the source MAC address in the packet. Accordingly, the destination VTEP can perform MAC learning even on a packet received from an intermediate VTEP.

Figure 2:
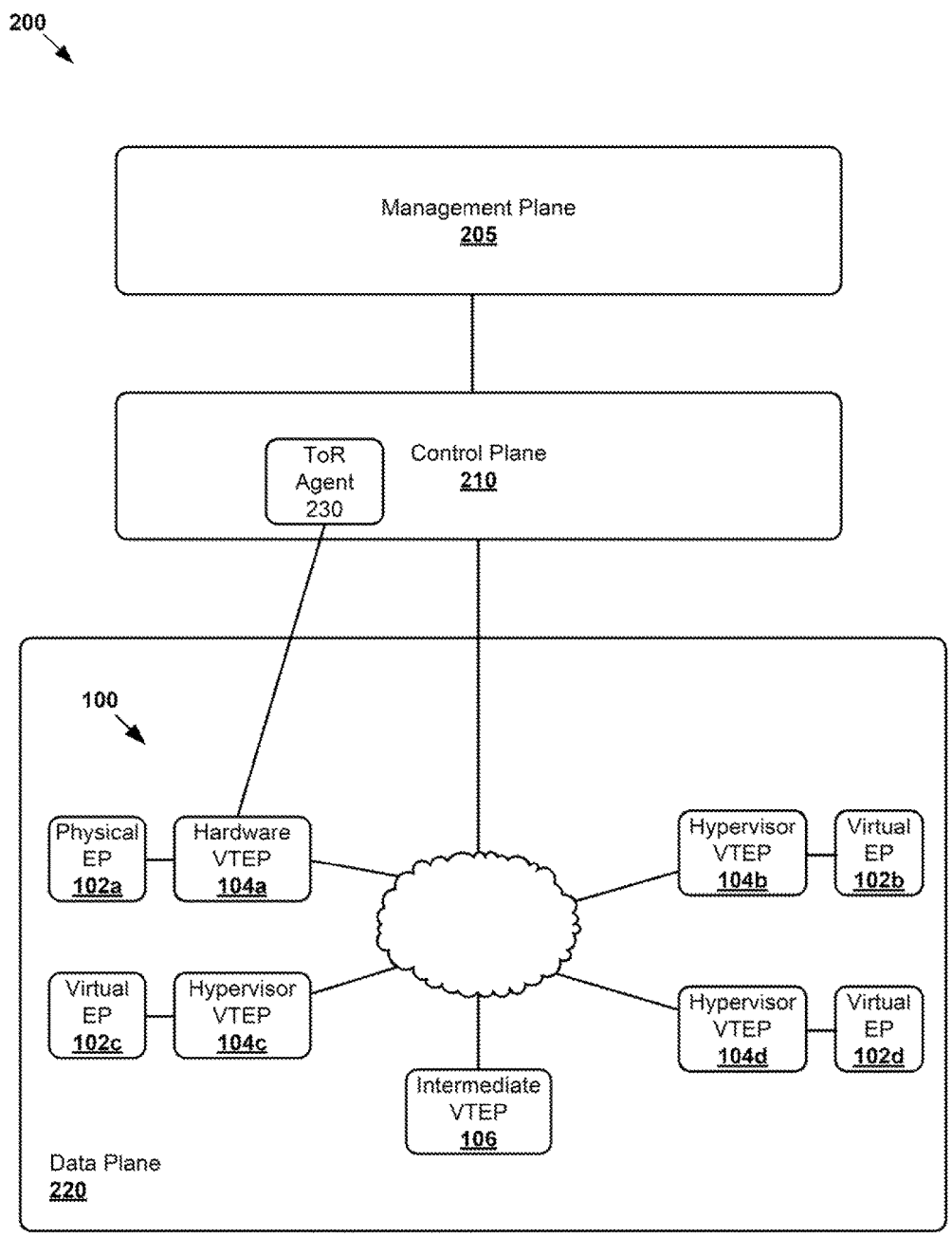
FIG. 2 is a block diagram of a network control system for the network of FIG. 1.

FIG. 2 is a block diagram of a network control system 200 for the network 100 of FIG. 1. Specifically, as shown, the network control system 200 includes a management plane 205, a central control plane 210, and a data plane 220. The EPs 102 and VTEPs 104 and 106 of the network 100, as shown, are implemented as part of the data plane 220.

Though shown as single entities, it should be understood that both the management plane 205 and central control plane 210 may be implemented as distributed or clustered systems. That is, management plane 205 may include multiple computers that implement management plane functions, and central control plane 210 may include multiple controller computers or virtual machines or containers (or other logical compute instances) that implement central control plane functions. In some embodiments, each such controller includes both management plane and central control plane functions (e.g., as separate applications or functions). Further, the management plane functions and control plane functions may be implemented on the same or different computers as VTEPs 104b-104d and EPs 102b-102d.

In some embodiments, management plane 205 receives logical network configuration inputs through an application programming interface (API). Users may further input logical network configuration data through an interface, e.g., a command-line interface, a graphical user interface, etc. Further, in some embodiments, management plane 205 assigns and manages VTEP labels for VTEPs (e.g., VTEPs 104 and 106) in the network 100. As previously described, management plane 205 may generate a unique VTEP label for each VTEP. The management plane 205 further associates the VTEP label with the IP address of the corresponding VTEP, and optionally, an indication (referred to as a VTEP type) of the types of communication protocols supported by the VTEP (e.g., VXLAN, Geneve, STT, etc.). Management plane 205 provides the information of the VTEP label, IP address, and VTEP type for each VTEP of network 100 to control plane 210.

Control plane 210 pushes the information of the VTEP label, IP address, and VTEP type for each VTEP of the network 100 to each of VTEPs 104 and 106 in network 100 that are not hardware VTEPs. In particular, hardware VTEPs may not be configured to receive, store, or manage such information. It should be noted, in some embodiments, some hardware VTEPs may be configured to receive, store, or manage such information and may receive such information from control plane 210 and work similar to non-hardware VTEPs discussed herein.

Accordingly, in some embodiments, control plane 210 includes one or more ToR agents 230, that serve as an "adapter" between hardware VTEPs (e.g., hardware VTEP 104a) and control plane 210. For example, control plane 210 controllers may communicate utilizing a proprietary protocol, while hardware VTEPs may communication using another protocol (e.g., Open vSwitch database (OVSDB)). ToR agent 230 may be configured to understand both protocols, and further facilitate control of the hardware VTEPs. Accordingly, for hardware VTEPs controlled by a ToR agent, control plane 210 pushes the information of the VTEP label, IP address, and VTEP type for each hardware VTEP of the network 100 to the ToR agent(s) 230.

In some embodiments, if a hardware VTEP joins a particular logical switch, ToR agent 230 maps the hardware VTEP to the assigned VTEP label for the hardware VTEP and reports the VTEP label, IP address, and VTEP type to control plane 210. Control plane 210 may then push updated information of the VTEP label, IP address, and VTEP type for the hardware VTEP to each of VTEPs 104 and 106 and/or other ToR agents 230 in network 100. In some embodiments, if a new hypervisor-based VTEP is created, or parameters of a hypervisor-based VTEP change, control plane 210 may push updated information of the VTEP label, IP address, and VTEP type for each new/updated hypervisor-based VTEP to each of the VTEPs 104 and 106 and/or ToR agents 230 in network 100.

In some embodiments, based on the VTEP label, IP address, and VTEP type information shared between the VTEPs, MAC learning is enabled for packets sent via intermediate VTEPs as follows. In some embodiments, when hardware VTEP 104a has a BUM packet to send to EP 102b, the hardware VTEP encapsulates the packet into an encapsulated packet (e.g., VXLAN packet) and sets a destination address in the encapsulated packet (i.e., outer packet header) as that of intermediate VTEP 106, and the source address in outer packet header as that of the hardware VTEP.

The inner packet includes a source MAC address of the EP 102a, and a destination MAC address of the destination EP 102b.

Upon receiving the encapsulated packet, the intermediate VTEP 106 determines the source IP address of the encapsulated packet, that being the IP address of the hardware VTEP 104a. The VTEP 106 then determines the VTEP label associated with the source VTEP 104a, based on the source IP address included in the outer header. Intermediate VTEP 106 uses mapping information associating VTEP label, IP address, and VTEP type for each VTEP of the network 100 previously received from the control plane 210 to determine the VTEP label. Intermediate VTEP 106 then extracts and re-encapsulates the inner packet, possibly using a different tunneling protocol (e.g., STT or Geneve), which may not be supported by hardware VTEP 104a. Intermediate VTEP 106 includes in the outer header of the re-encapsulated packet the source IP address of intermediate VTEP 106 and the destination IP address of the destination VTEP 104b based on the destination MAC address of EP 102b in the inner packet. In addition, the intermediate VTEP 106 includes the VTEP label for the VTEP 104a in the encapsulated packet as corresponding to the actual source IP of the original outer header of the received packet.

Destination VTEP 104b then receives the re-encapsulated packet from the intermediate VTEP 106. Since the outer packet header includes the VTEP label for the source VTEP 104a, the VTEP 104b can determine the IP address of the hardware VTEP 104a by mapping the source VTEP's label to its IP address. The destination VTEP 104b may then perform MAC learning by associating the source MAC address of the inner packet to the IP address of the source VTEP 104a and recording this association in its table so that when endpoint 102b sends a packet back to endpoint 102a, VTEP 104b can use that recorded association to immediately encapsulate that packet with an outer header directed to VTEP 104a without querying control plane 210 or utilizing intermediate VTEP 106. More particularly, VTEP 104b may store a mapping (e.g., in a local memory accessible by VTEP 104b) of the source MAC address to the IP address of the source VTEP. VTEP 104b may further utilize the stored mapping to directly send packets for the EP 102a to hardware VTEP 104a, without having to query the control plane 210 or perform a flooding procedure. Accordingly, based on the VTEP label information included in the encapsulated packet by an intermediate VTEP, a destination VTEP can perform MAC learning of packets sent by a source VTEP.

Figure 3:
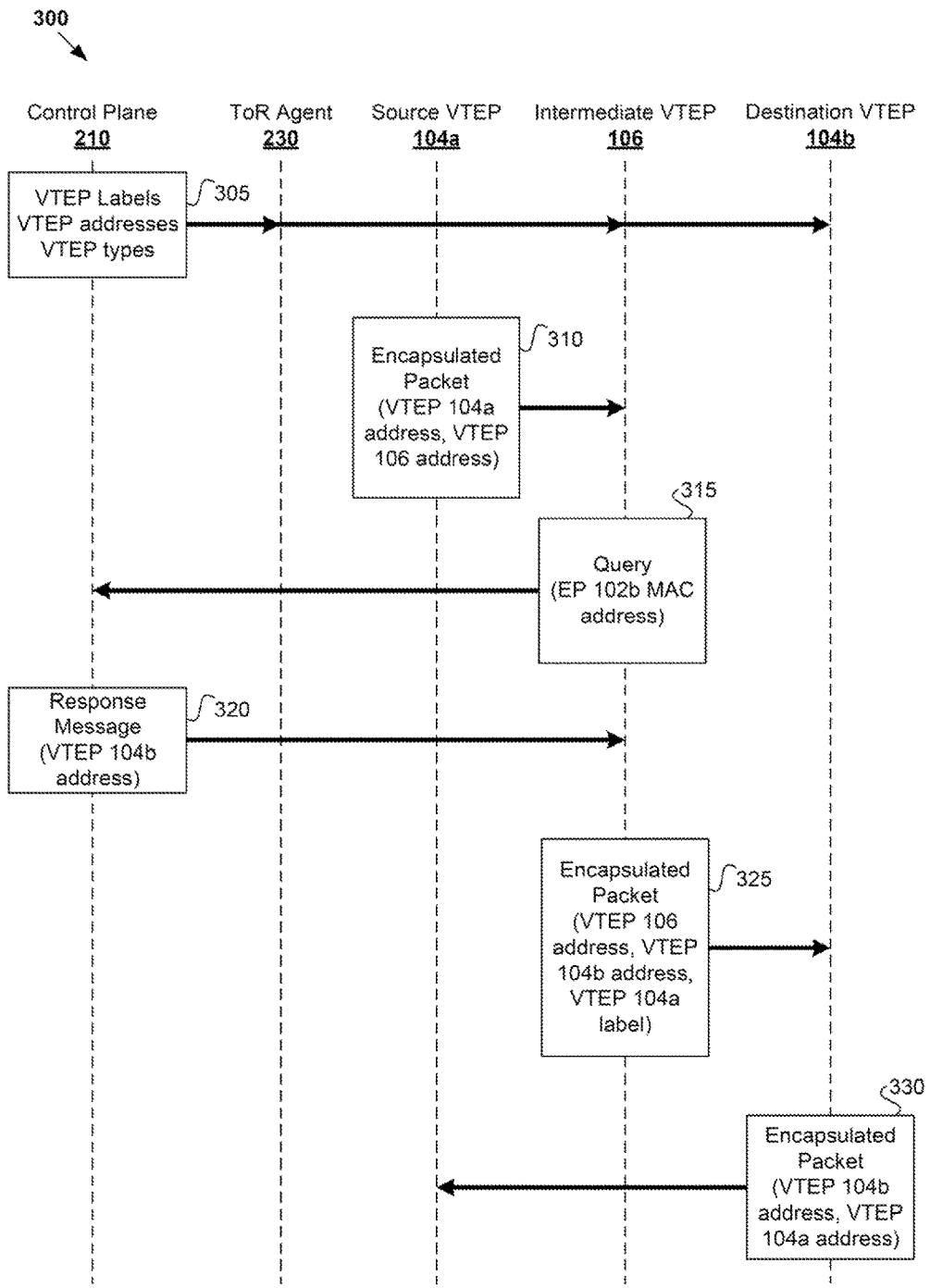
FIG. 3 is an example of a signal flow diagram for performing media access control (MAC) learning for broadcast, unknown unicast, and multicast (BUM) packets from hardware VTEPs.

FIG. 3 is an example of a signal flow diagram 300 for performing MAC learning for BUM packets from hardware VTEPs. At 305, control plane 210 sends information of the VTEP label, IP address, and VTEP type for each VTEP of the network 100 to ToR Agent 230, intermediate VTEP 106, and VTEP 104b.

Hardware VTEP 104a, acting as a source VTEP, receives a BUM packet to send (e.g., from EP 102a shown in FIG. 2). The BUM packet may include a source MAC address of the source EP (e.g., EP 102a), the source port, the destination MAC address of the destination EP (e.g., EP 102b), and a protocol type. Hardware VTEP 104a, at 310, encapsulates the BUM packet and sends the encapsulated packet to intermediate VTEP 106. Hardware VTEP 104a includes in the outer header of the encapsulated packet a source address corresponding to the IP address of hardware VTEP 104a, and a destination address corresponding to the IP address of intermediate VTEP 106 because, for example, hardware VTEP 104a is programmed to send BUM packets by default to intermediate VTEP 106.

Intermediate VTEP 106 receives the encapsulated packet and determines the IP address of the source VTEP, i.e., the IP address of hardware VTEP 104a, for the encapsulated packet based on the outer header information of the encapsulated packet. Intermediate VTEP 106 further identifies the VTEP label associated with the source VTEP for the encapsulated packet by matching the determined IP address of the hardware VTEP 104a to the corresponding VTEP label based on the information received from the control plane 210 in operation 305. Intermediate VTEP 106 further determines a destination VTEP for the encapsulated packet based on the destination MAC address included in the inner packet header. For example, intermediate VTEP 106 may already have stored a mapping of the destination MAC address included in the inner packet to an IP address of an associated VTEP. Otherwise, for example, at 315, intermediate VTEP 106 may send a message to query control plane 210 (or performs a flooding procedure (not shown)) for the VTEP associated with the destination MAC address of EP 102b. At 320, control plane 210 may send a message to intermediate VTEP 106 indicating that VTEP 104b is associated with the destination MAC address of EP 102b and including the IP address of the VTEP 104b.

At 325, intermediate VTEP 106 extracts and re-encapsulates the inner packet from the encapsulated packet received at 310, and sends the encapsulated packet to VTEP 104b. Intermediate VTEP 106 includes in the outer header of the re-encapsulated packet a source address corresponding to the IP address of the intermediate VTEP 106, a destination address corresponding to the IP address of destination VTEP 104b, and a label associated with source hardware VTEP 104a.

VTEP 104b receives the re-encapsulated packet from intermediate VTEP 106 and performs MAC learning by associating the source MAC address of EP 102a included in the header of the inner packet to the VTEP label of hardware VTEP 104a included in the outer header of the encapsulated packet. VTEP 104b may store the mapping of the source MAC address to the IP address of source VTEP 104a to directly send packets for EP 102a to hardware VTEP 104a.

For example, VTEP 104b acting as a source VTEP, receives a packet from EP 102b (shown in FIG. 2). The packet may include a source MAC address of EP 102b, the source port, the destination MAC address of EP 102a, and a protocol type. VTEP 104b determines it has a mapping of the MAC address of EP 102a to the VTEP label or IP address of VTEP 104a. VTEP 104b may match the VTEP label of VTEP 104a to the IP address of VTEP 104a based on the information received from the control plane 210 in operation 305. This step is unnecessary if the VTEP stores a mapping of the source MAC address of the EP to the IP address of the corresponding VTEP instead of to the VTEP label of the corresponding VTEP.

VTEP 104b, at 330, encapsulates the packet and sends the encapsulated packet to the hardware VTEP 104a. The VTEP 104b includes in the outer header of the encapsulated packet a source address corresponding to the IP address of the VTEP 104b, and a destination address corresponding to the IP address of the hardware VTEP 104a.

Figure 4:
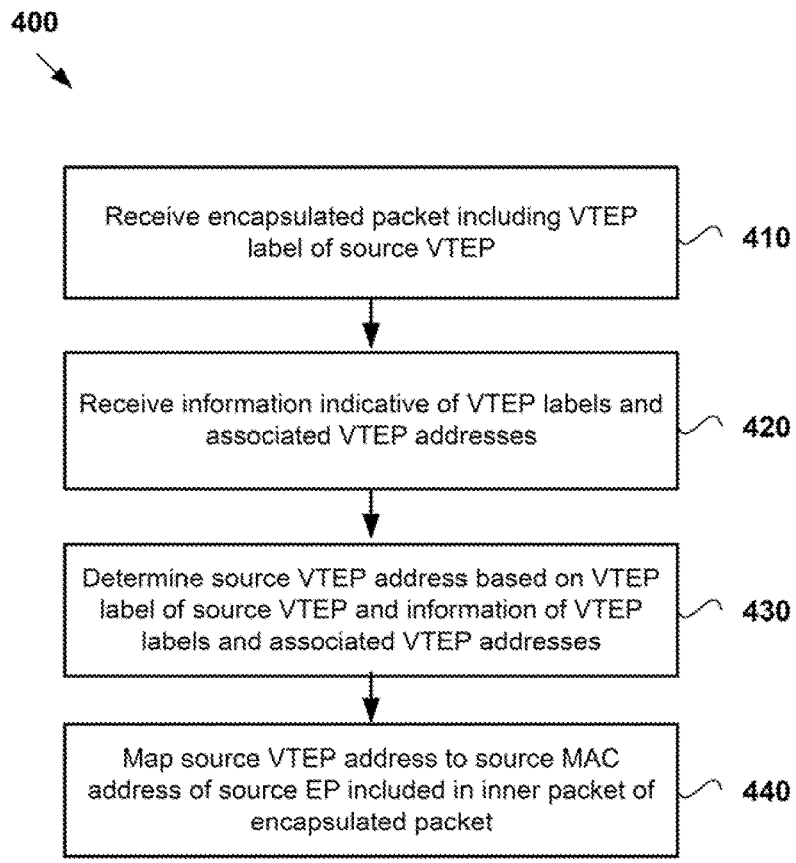
FIG. 4 illustrates example operations for performing MAC learning for BUM packets from hardware VTEP.

FIG. 4 illustrates example operations for performing MAC learning for BUM packets from hardware VTEP.

At 410, a destination VTEP receives an encapsulated packet. The encapsulated packet includes a source IP address associated with an intermediate VTEP, a destination IP address associated with the destination VTEP, and a first label associated with a source VTEP. The encapsulated packet further includes an inner packet. The inner packet includes a source media access control address of a source endpoint.

At 420, the destination VTEP receives information indicative of a plurality of labels and associated addresses of VTEPs. The destination VTEP may receive this information from the control plane. It should be noted that this operation may precede operation 410, or it may query the control plane in response to receiving the encapsulated packet with an unknown source VTEP label.

At 430, the destination VTEP determines a first address associated with the source VTEP based on the first label and the information indicative of the plurality of labels and associated addresses of VTEPs.

At 440, the destination VTEP maps the first address of the source VTEP to the source media access control address of the source endpoint. Accordingly, the destination VTEP performs MAC learning for the encapsulated packet received from the intermediate VTEP.

Figure 5:
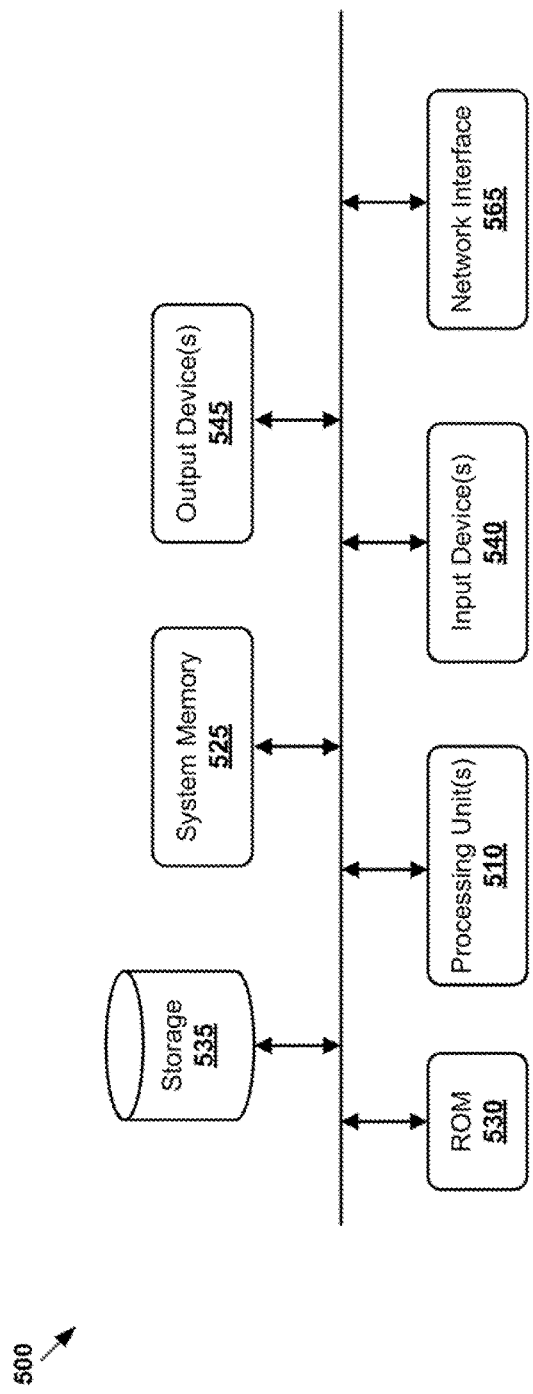
FIG. 5 illustrates an example of an electronic system with which some embodiments of the invention are implemented.

FIG. 5 illustrates an example of an electronic system 500 with which some embodiments of the invention are implemented. The electronic system 500 can be used to execute any of the control, virtualization, or operating system applications described above. The electronic system 500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 500 includes a bus 505, processing unit(s) 510, a system memory 525, a read-only memory 530, a permanent storage device 535, input devices 540, and output devices 545.

The bus 505 collectively represents all system, peripheral, and chipset buses that communicatively connect the numerous internal devices of the electronic system 500. For instance, the bus 505 communicatively connects the processing unit(s) 510 with the read-only memory 530, the system memory 525, and the permanent storage device 535.

From these various memory units, the processing unit(s) 510 retrieve instructions to execute and data to process in order to execute the processes of the invention. The processing unit(s) may be a single processor or a multi-core processor in different embodiments.

The read-only-memory (ROM) 530 stores static data and instructions that are needed by the processing unit(s) 510 and other modules of the electronic system. The permanent storage device 535, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 535.

Other embodiments use a removable storage device (such as a floppy disk, flash drive, etc.) as the permanent storage device. Like the permanent storage device 535, the system memory 525 is a read-and-write memory device. However, unlike storage device 535, the system memory is a volatile read-and-write memory, such a random access memory. The system memory stores some of the instructions and data that the processor needs at runtime. In some embodiments, the invention's processes are stored in the system memory 525, the permanent storage device 535, and/or the read-only memory 530. From these various memory units, the processing unit(s) 510 retrieve instructions to execute and data to process in order to execute the processes of some embodiments.

The bus 505 also connects to the input and output devices 540 and 545. The input devices enable the user to communicate information and select commands to the electronic system. The input devices 540 include alphanumeric keyboards and pointing devices (also called "cursor control devices"). The output devices 545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 5, bus 505 also couples electronic system 500 to a network 565 through a network adapter (not shown). In this manner, the computer can be a part of a network of computers (such as a local area network ("LAN"), a wide area network ("WAN"), or an Intranet, or a network of networks, such as the Internet. Any or all components of electronic system 500 may be used in conjunction with the invention.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for performing media access control learning, the method comprising:
   receiving, at a destination VTEP (tunnel endpoint), an encapsulated packet, the encapsulated packet comprising a source address associated with an intermediate VTEP, a destination address associated with the destination VTEP, and a first label associated with a source VTEP, the encapsulated packet further comprising an inner packet, the inner packet comprising a source media access control address of a source endpoint;
   receiving, at the destination VTEP, information indicative of a plurality of labels and associated addresses of VTEPs;
   determining, by the destination VTEP, a first address associated with the source VTEP based on the first label and the information indicative of the plurality of labels and associated addresses of VTEPs; and
   mapping the first address of the source VTEP to the source media access control address of the source endpoint.

2. The method of claim 1, wherein the source VTEP comprises a hardware VTEP.

3. The method of claim 1, wherein the information indicative of the plurality of labels and associated addresses of VTEPs is received from a control plane.

4. The method of claim 1, wherein each of the plurality of labels comprises a unique value associated with a particular VTEP.

5. The method of claim 1, further comprising:
   receiving, at the destination VTEP, a packet from an endpoint associated with the destination VTEP, the packet including a destination media access control address of the source endpoint;
   determining a second destination address for the packet to be the first address of the source VTEP based on the mapping; and
   encapsulating and sending the packet to the source VTEP.

6. The method of claim 1, wherein the inner packet comprises a broadcast, unknown unicast, and multicast packet.

7. The method of claim 1, further comprising:
   receiving, at the intermediate VTEP, a second encapsulated packet comprising a source address associated with the source VTEP, and a destination address associated with the intermediate VTEP;
   receiving, at the intermediate VTEP, the information indicative of the plurality of labels and associated addresses of VTEPs;
   determining, by the intermediate VTEP, the first label associated with the source VTEP based on the source address associated with the source VTEP and the information indicative of the plurality of labels and associated addresses of VTEPs; and
   sending, by the intermediate VTEP, the encapsulated packet comprising the first label associated with the source VTEP.

8. A non-transitory computer readable medium comprising instructions to be executed in a computer system, wherein the instructions when executed in the computer system perform a method for performing media access control learning, the method comprising:

receiving, at a destination VTEP, an encapsulated packet, the encapsulated packet comprising a source address associated with an intermediate VTEP, a destination address associated with the destination VTEP, and a first label associated with a source VTEP, the encapsulated packet further comprising an inner packet, the inner packet comprising a source media access control address of a source endpoint;

receiving, at the destination VTEP, information indicative of a plurality of labels and associated addresses of VTEPs;

determining, by the destination VTEP, a first address associated with the source VTEP based on the first label and the information indicative of the plurality of labels and associated addresses of VTEPs; and mapping the first address of the source VTEP to the source media access control address of the source endpoint.

9. The computer readable medium of claim 8, wherein the source VTEP comprises a hardware VTEP.

10. The computer readable medium of claim 8, wherein the information indicative of the plurality of labels and associated addresses of VTEPs is received from a control plane.

11. The computer readable medium of claim 8, wherein each of the plurality of labels comprises a unique value associated with a particular VTEP.

12. The computer readable medium of claim 8, wherein the method further comprises:

receiving, at the destination VTEP, a packet from an endpoint associated with the destination VTEP, the packet including a destination media access control address of the source endpoint;

determining a second destination address for the packet to be the first address of the source VTEP based on the mapping; and encapsulating and sending the packet to the source VTEP.

13. The computer readable medium of claim 8, wherein the inner packet comprises a broadcast, unknown unicast, and multicast packet.

14. The computer readable medium of claim 8, wherein the method further comprises:

receiving, at the intermediate VTEP, a second encapsulated packet comprising a source address associated with the source VTEP, and a destination address associated with the intermediate VTEP;

receiving, at the intermediate VTEP, the information indicative of the plurality of labels and associated addresses of VTEPs;

determining, by the intermediate VTEP, the first label associated with the source VTEP based on the source address associated with the source VTEP and the information indicative of the plurality of labels and associated addresses of VTEPs; and sending, by the intermediate VTEP, the encapsulated packet comprising the first label associated with the source VTEP.

15. A computer system, wherein system software for the computer system is programmed to execute a method for performing media access control learning, said method comprising:

receiving, at a destination VTEP, an encapsulated packet, the encapsulated packet comprising a source address associated with an intermediate VTEP, a destination address associated with the destination VTEP, and a first label associated with a source VTEP, the encapsulated packet further comprising an inner packet, the inner packet comprising a source media access control address of a source endpoint;

receiving, at the destination VTEP, information indicative of a plurality of labels and associated addresses of VTEPs;

determining, by the destination VTEP, a first address associated with the source VTEP based on the first label and the information indicative of the plurality of labels and associated addresses of VTEPs; and mapping the first address of the source VTEP to the source media access control address of the source endpoint.

16. The computer system of claim 15, wherein the source VTEP comprises a hardware VTEP.

17. The computer system of claim 15, wherein the information indicative of the plurality of labels and associated addresses of VTEPs is received from a control plane.

18. The computer system of claim 15, wherein each of the plurality of labels comprises a unique value associated with a particular VTEP.

19. The computer system of claim 15, wherein the method further comprises:

receiving, at the destination VTEP, a packet from an endpoint associated with the destination VTEP, the packet including a destination media access control address of the source endpoint;

determining a second destination address for the packet to be the first address of the source VTEP based on the mapping; and encapsulating and sending the packet to the source VTEP.

20. The computer system of claim 15, wherein the inner packet comprises a broadcast, unknown unicast, and multicast packet.

21. The computer system of claim 15, wherein the method further comprises:

receiving, at the intermediate VTEP, a second encapsulated packet comprising a source address associated with the source VTEP, and a destination address associated with the intermediate VTEP;

receiving, at the intermediate VTEP, the information indicative of the plurality of labels and associated addresses of VTEPs;

determining, by the intermediate VTEP, the first label associated with the source VTEP based on the source address associated with the source VTEP and the information indicative of the plurality of labels and associated addresses of VTEPs; and sending, by the intermediate VTEP, the encapsulated packet comprising the first label associated with the source VTEP.

22. A computer system comprising:

means for receiving, at a destination VTEP, an encapsulated packet, the encapsulated packet comprising a source address associated with an intermediate VTEP, a destination address associated with the destination VTEP, and a first label associated with a source VTEP, the encapsulated packet further comprising an inner packet, the inner packet comprising a source media access control address of a source endpoint;

means for receiving, at the destination VTEP, information indicative of a plurality of labels and associated addresses of VTEPs;

means for determining, by the destination VTEP, a first address associated with the source VTEP based on the first label and the information indicative of the plurality of labels and associated addresses of VTEPs; and means for mapping the first address of the source VTEP to the source media access control address of the source endpoint.

\* \* \* \* \*